(12) United States Patent
Raymond et al.

(10) Patent No.: US 8,475,288 B2
(45) Date of Patent: Jul. 2, 2013

(54) SNOW AND WATER SLIDING CARRIER FOR AMUSEMENT CENTER

(76) Inventors: Nicolas Raymond, Piedmont (CA); Mercier Raymond, Piedmont (CA)

( * ) Notice: Subject to any disclaimer, the term of this patent is extended or adjusted under 35 U.S.C. 154(b) by 278 days.

(21) Appl. No.: 13/152,723

(22) Filed: Jun. 3, 2011

(65) Prior Publication Data
US 2012/0309550 A1 Dec. 6, 2012

(51) Int. Cl.
*A63H 23/10* (2006.01)
*B63B 35/00* (2006.01)

(52) U.S. Cl.
USPC .............................. 472/129; 472/117; 441/67

(58) Field of Classification Search
USPC 472/13, 116, 117, 128, 129, 88–90; 114/346; 441/35, 40, 67
See application file for complete search history.

(56) References Cited

U.S. PATENT DOCUMENTS

| 2,826,163 | A | | 3/1958 | King |
| 2,878,858 | A | * | 3/1959 | Winchester ..................... 472/25 |
| D269,082 | S | | 5/1983 | Spieldiener |
| 4,516,943 | A | | 5/1985 | Spieldiener et al. |
| 4,744,326 | A | * | 5/1988 | Harding ......................... 114/345 |
| 5,570,480 | A | * | 11/1996 | Yeung ................................. 4/487 |
| 5,899,782 | A | * | 5/1999 | Martin ............................. 441/66 |
| 5,989,126 | A | | 11/1999 | Kilbert et al. |
| 6,709,340 | B2 | * | 3/2004 | Gordon .......................... 472/134 |
| 6,840,830 | B1 | * | 1/2005 | Harlan ............................. 441/35 |
| 7,610,870 | B1 | | 11/2009 | Zuseybida |

FOREIGN PATENT DOCUMENTS

| DE | 3246425 | 6/1984 |
| EP | 1930056 | 9/2007 |

* cited by examiner

*Primary Examiner* — Kien Nguyen

(57) ABSTRACT

A snow and water sliding carrier for amusement center has a body having a general shape of a torus having a central opening, a floor member that closes the central opening, and has an opposite side defining a bottom member, such that the floor member is concave and the bottom member is convex. The bottom member extends beyond the floor member and is co-joined with the outside wall, and includes a plurality of threaded receptacles adapted to receive respective threaded nipples, wherein each threaded nipple is adapted to be threaded into a respective receptacle in varying amounts, such that a predetermined rotation of the sliding carrier is induced and controlled.

14 Claims, 4 Drawing Sheets

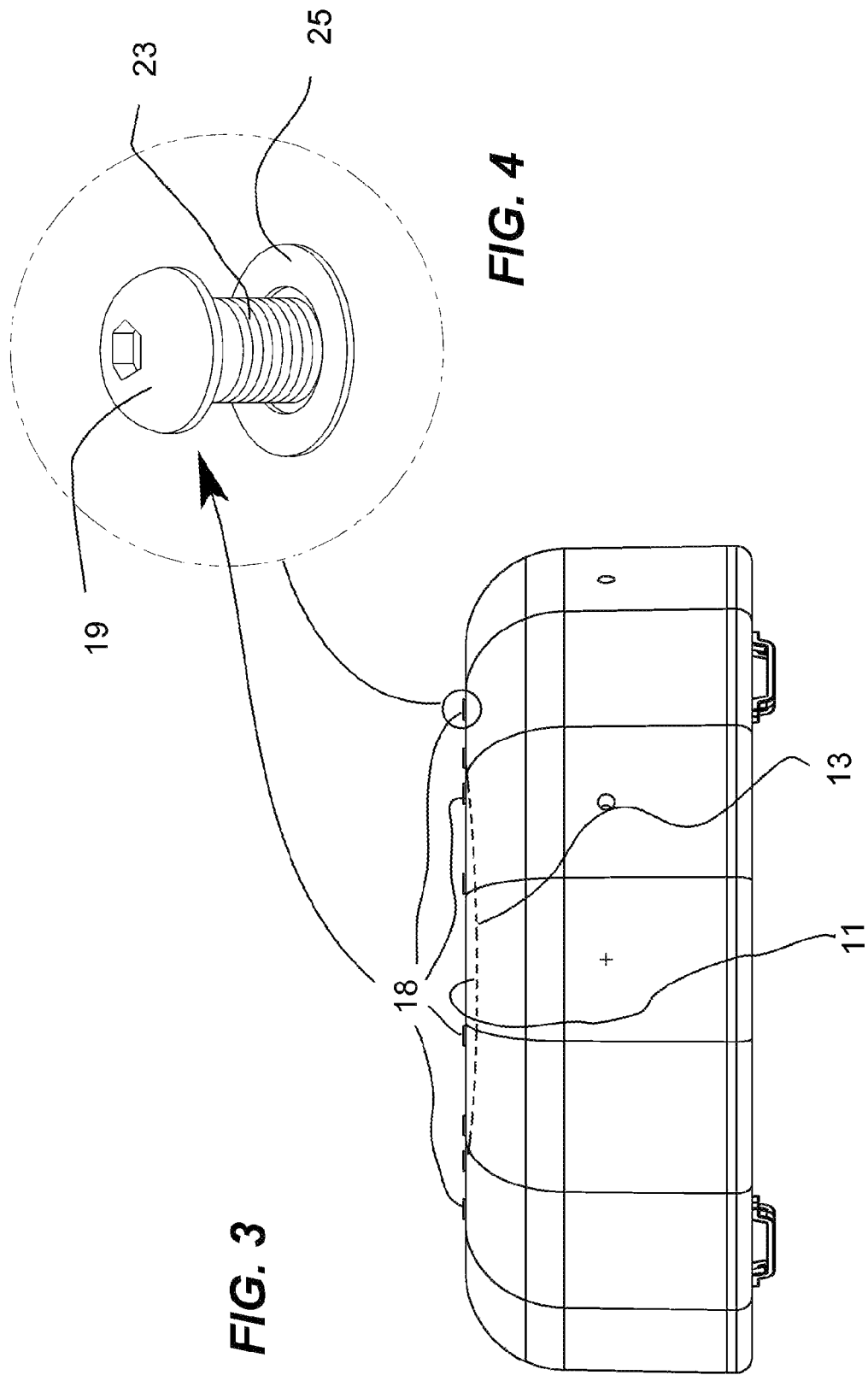

SNOW AND WATER SLIDING CARRIER FOR AMUSEMENT CENTER

FIELD OF THE INVENTION

The present invention relates generally to amusement devices but more particularly to a snow and water sliding carrier for amusement center.

BACKGROUND OF THE INVENTION

Current devices of this type are inflatable and lack a means to control rotation of the device as it slides down. There are also issues with weight. For example, there are carriers wherein the device consists in a generally circular shaped hull fabricated in two sections with a surrounding flotation bumper and separate redundant flotation material in the bottom of the hull. A multiplicity of inwardly facing high-backed seats are disposed around the inner periphery of the hull with a circular hand-hold in the center.

Another prior art consists in a ride having a spin mechanism which makes use of elements of the slide, or water course wherein the spin mechanism includes a movement retarding surface along one wall of the water course and a movement expediting surface along an opposite wall of the water course. The movement retarding surface is provided with a high friction coating which retards sliding movement in a downstream direction of the surface of the raft which contacts the movement retarding surface, and induces rotation of the raft and movement towards the opposite wall. As the raft rotates into contact with the movement expediting surface it encounters no frictional resistance, and the spin is accelerated by the force of gravity acting on the mass of the raft as it moves downhill.

Yet another prior art ride includes a motor intended to be used for motorized boating and for forming-up with adjacent similar boats to form a continuous and contiguous mat of boats for socializing, fishing etc. The adjacent boats interlock and form an array of such boats all interlocked with one another. The boats may be shaped in planform as hexagons or other polygons but are preferably regular polygons which interlock without leaving gaps between adjacent boats. Each boat has a center well in which is mounted a motor.

The prior art uses many different components which make them heavy, cumbersome and costly to manufacture. Also, their complicated designs requires extensive maintenance and may make them unreliable.

SUMMARY OF THE INVENTION

In view of the foregoing disadvantages inherent in the known devices now present in the prior art, the present invention, which will be described subsequently in greater detail, is to provide objects and advantages which are:

To provide for an economical, lightweight sliding device.

Another advantage of this invention is to provide for a device that has fewer components than current devices.

Yet another advantage of this invention is to provide for a device that has a rotation means that is simple and that can be easily adjusted so as to control its rotation speed.

To attain these ends, the present invention generally comprises a body having a general shape of a torus having a central opening, a floor member that closes the central opening, and has an opposite side defining a bottom member, such that the floor member is concave and the bottom member is convex.

An outside perimeter of the body defining an outside wall, and an inside perimeter including a plurality of integral seat, seat bottom, and seat back portions, such that each of the seat bottom extends upwardly from the floor member and connects with each respective seat, each of the seat then connects with a respective seat back, and then each of the seat back connects with the outside wall, thereby forming a single monolithic structure. The bottom member extends beyond the floor member and is co-joined with the outside wall, and includes a plurality of threaded receptacles adapted to receive respective threaded nipples, wherein each threaded nipple is adapted to be threaded into a respective receptacle in varying amounts, such that a predetermined rotation of the sliding carrier is induced and controlled.

The snow and water sliding carrier has its body formed including flexible portions and rigid portions.

The handles are attached to the sides of each seat.

The backs and bottoms of each of the seat are molded in a shape having curvatures to increase the friction between each seat and a user, and to increase comfort to each the user.

The nipple includes a threaded stem and a head at a distal end thereof, and the diameter of each respective head is determined by the amount and type of rotation desired of the sliding carrier.

The head of each the nipple is formed such that a predetermined amount of friction is created between the nipple and a sliding surface to thereby create a desired rotation of the sliding carrier with respect to the sliding surface.

The head of each the nipple is shaped such that a variety of tools can be used to rotate them appropriately; and wherein the tools are chosen from a list of tools including screw drivers, Allen keys, and wrenches.

The invention is an amusement center ride comprising a sliding surface and a sliding carrier, the sliding surface adapted to hold and allow sliding and rotational motions of a sliding carrier down an inclined and twisting path, and the sliding carrier has a body having a size adapted to fit within the sliding surface, and general shape of a torus having a central opening, a floor member that closes the central opening, and has an opposite side defining a bottom member, such that the floor member is concave and the bottom member is convex.

An outside perimeter of the body defining an outside wall, and an inside perimeter including a plurality of integral seat, seat bottom, and seat back portions, such that each the seat bottom extends upwards from the floor member and connects with each respective seat, each the seat then connects with a respective seat back, and then each the seat back connects with the outside wall, thereby forming a single monolithic structure. The bottom member extends beyond the floor member and is co-joined with the outside wall, and includes a plurality of threaded receptacles adapted to receive respective threaded nipples, wherein each threaded nipple is adapted to be threaded into a respective receptacle in varying amounts, such that a predetermined rotation of the sliding carrier with respect to the sliding surface is induced and controlled.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 3 Side view.
FIG. 4 Isometric view of a nipple.

DETAILED DESCRIPTION OF THE PREFERRED EMBODIMENT

Figure 1:
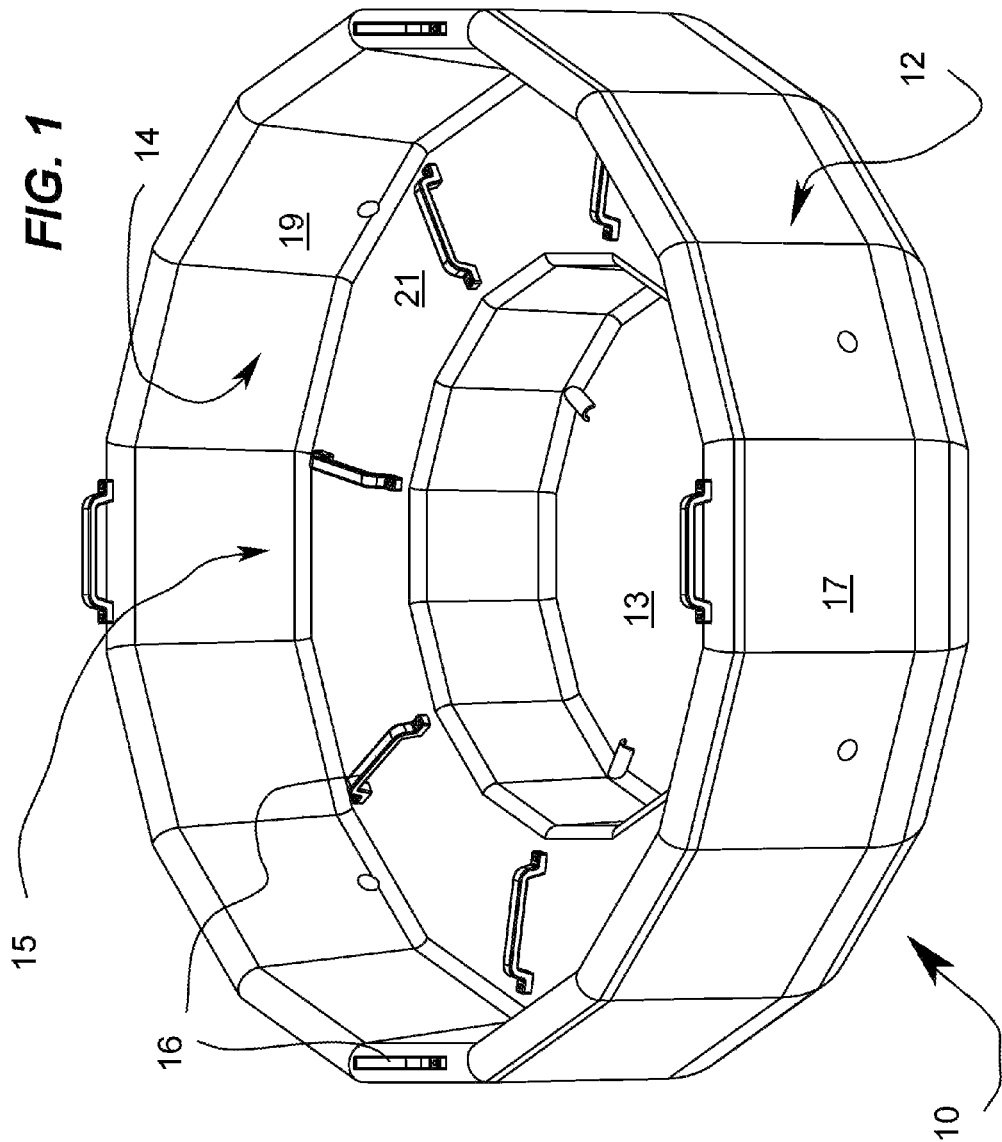
FIG. 1 Isometric view of the invention.
Figure 2:
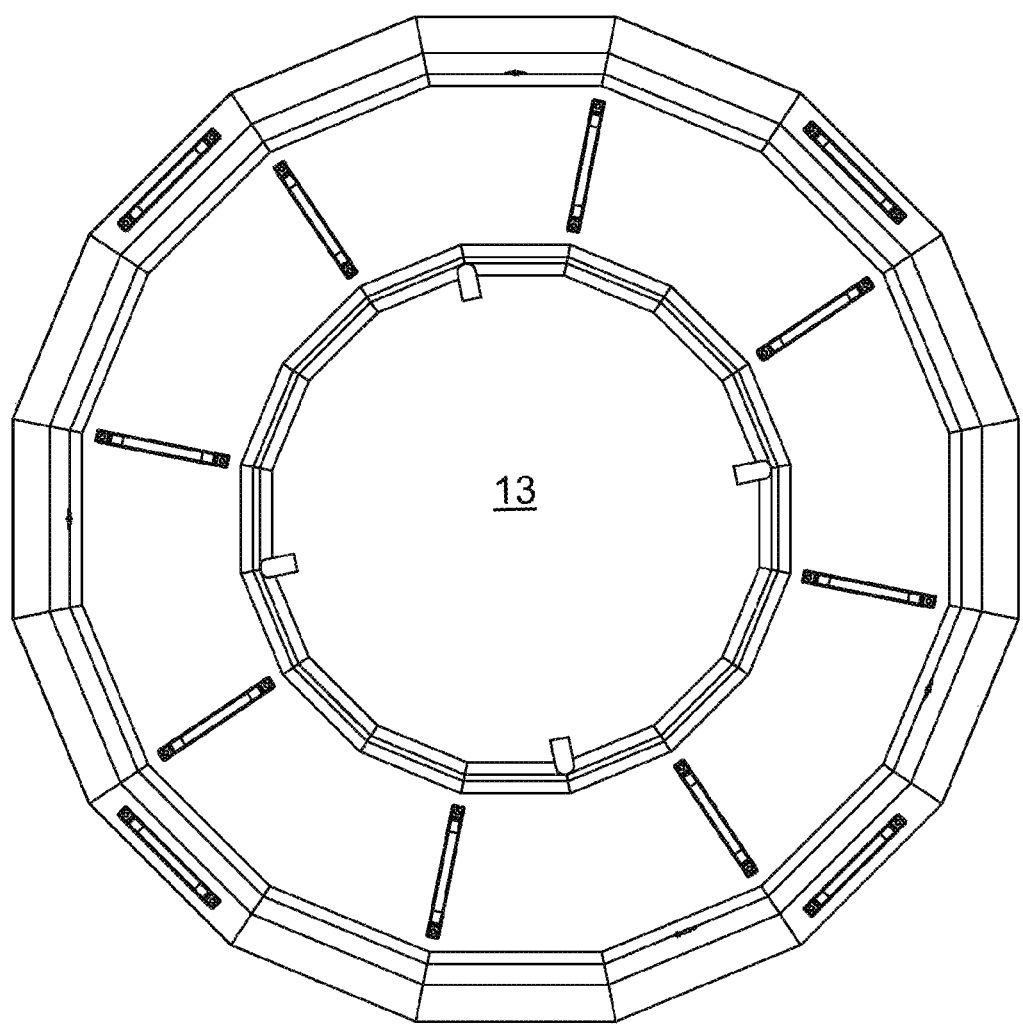
FIG. 2 Top view.
Figure 5:
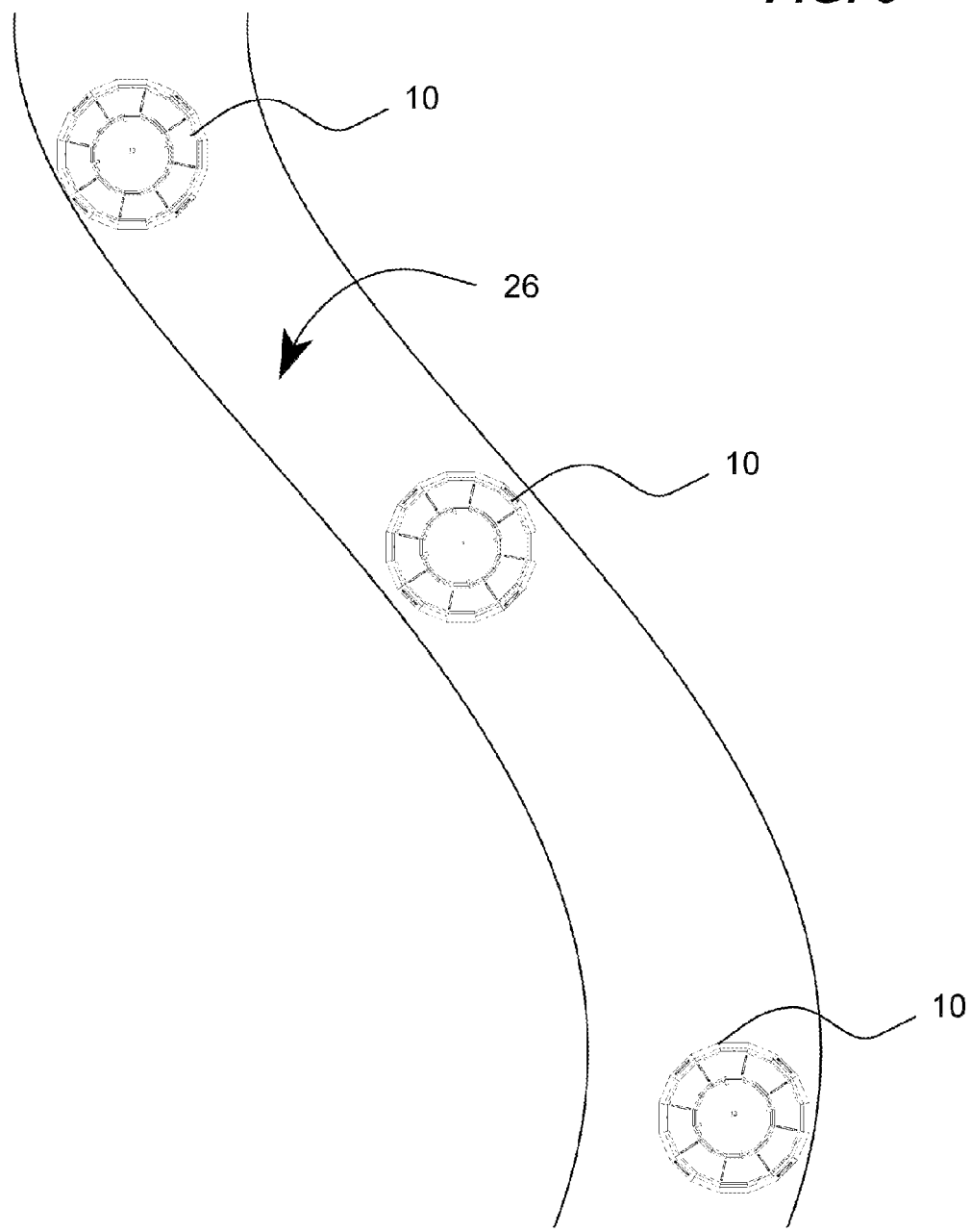
FIG. 5 Plan view of the invention in combination with a slide.

A snow and water sliding carrier (10) for amusement center has a rigid but flexible body (12). The body (12) has the general shape of a torus but with a floor member (13) which closes a central opening (15). The floor member (13) has its opposite side defining a bottom member (11). The bottom member (11) is concave which makes the floor member (13) convex.

The body (12) has an outside perimeter which defines an outside wall (17) while a plurality of seats (14) form an integral part of an interior perimeter wherein the seat's back (19) represents an interior wall and the seat's bottom (21) extends integrally and upwardly from the floor (13), connect with the seat's back (19) which itself connects with the outside wall (17) in a single monolithic structure. On the side of each seat (14) are handles (16). The seats (14) are configured so as to be ergonomic in the sense that the back (19) and the bottom (21) are molded to have a degree of curvature for comfort as well as to reduce slipping of the occupants.

The bottom member (11) extends beyond the floor (13) and is co-joined with the outside wall (17) which extends vertically therefrom.

The bottom (11) has a plurality of nipples (18) used for inducing rotation to the sliding carrier (10) as it slides down a hill. The nipples (18) are threadable means having a head (19) of any of a variety of diameters, and a threaded stem (23). Depending upon the quantity of nipples (18) used, their head (19) diameter and the degree to which they are threaded in, in other words, to what length they perpendicularly extend from the bottom (11), determines the rotation speed.

Since they are threadably engaged, the nipples (18) are easy to remove, replace, extend or protract by how much the threaded stem (23) is threaded into its threaded receptacle (25) which is embedded into the bottom (11). A tool such as an allen key, for example, can be used for threading and unthreading the nipple (18).

In use, the now and water sliding carrier (10) slides down a path (26) which can be either a water slide or a snow covered slope. The nipples (18) create varying degrees of friction, by a combination of exposed length (how much they are threaded in) and the size and shape of the head (19).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A snow and water sliding carrier for an amusement center ride comprising a body having a general shape of a torus having a central opening; a floor member that closes said central opening, and has an opposite side defining a bottom member, such that said floor member is concave and said bottom member is convex; an outside perimeter of said body defining an outside wall, and an inside perimeter including a plurality of integral seat, seat bottom, and seat back portions, such that each said seat bottom extends upwards from said floor member and connects with each respective seat, each said seat then connects with a respective seat back, and then each said seat back connects with said outside wall, thereby forming a single monolithic structure; said bottom member extends beyond said floor member and is co-joined with said outside wall, and includes a plurality of threaded receptacles adapted to receive respective threaded nipples, wherein each threaded nipple is adapted to be threaded into a respective receptacle in varying amounts, such that a predetermined rotation of said sliding carrier is induced and controlled.

2. The snow and water sliding carrier of claim 1, wherein said body is formed including flexible portions and rigid portions.

3. The snow and water sliding carrier of claim 1, wherein handles are attached to the sides of each seat.

4. The snow and water sliding carrier of claim 1, wherein the backs and bottoms of each said seat are molded in a shape having curvatures to increase the friction between each seat and a user, and to increase comfort to each said user.

5. The snow and water sliding carrier of claim 1, wherein each said nipple includes a threaded stem and a head at a distal end thereof, and wherein the diameter of each respective head is determined by the amount and type of rotation desired of said sliding carrier.

6. The snow and water sliding carrier of claim 5, wherein the head of each said nipple is formed such that a predetermined amount of friction is created between the nipple and a sliding surface to thereby create a desired rotation of said sliding carrier with respect to said sliding surface.

7. The snow and water sliding carrier of claim 5, wherein the head of each said nipple is shaped such that a variety of tools can be used to rotate them appropriately; and wherein said tools are chosen from a list of tools including screw drivers, Allen keys, and wrenches.

8. An amusement center ride comprising a sliding surface and a sliding carrier, said sliding surface adapted to hold and allow sliding and rotational motions of a sliding carrier down an inclined and twisting path: and said sliding carrier comprising a body having a size adapted to fit within said sliding surface, and general shape of a torus having a central opening; a floor member that closes said central opening, and has an opposite side defining a bottom member, such that said floor member is concave and said bottom member is convex; an outside perimeter of said body defining an outside wall, and an inside perimeter including a plurality of integral seat, seat bottom, and seat back portions, such that each said seat bottom extends upwards from said floor member and connects with each respective seat, each said seat then connects with a respective seat back, and then each said seat back connects with said outside wall, thereby forming a single monolithic structure; said bottom member extends beyond said floor member and is co-joined with said outside wall, and includes a plurality of threaded receptacles adapted to receive respective threaded nipples, wherein each threaded nipple is adapted to be threaded into a respective receptacle in varying amounts, such that a predetermined rotation of said sliding carrier with respect to said sliding surface is induced and controlled.

9. The snow and water sliding carrier of claim 8, wherein said body is formed including flexible portions and rigid portions.

10. The snow and water sliding carrier of claim 8, wherein handles are attached to the sides of each seat.

11. The snow and water sliding carrier of claim 8, wherein the backs and bottoms of each said seat are molded in a shape having curvatures to increase the friction between each seat and a user, and to increase comfort to each said user.

12. The snow and water sliding carrier of claim 8, wherein each said nipple includes a threaded stem and a head at a distal end thereof, and wherein the diameter of each respective head is determined by the amount and type of rotation desired of said sliding carrier.

13. The snow and water sliding carrier of claim 12, wherein the head of each said nipple is formed such that a predetermined amount of friction is created between the nipple and a sliding surface to thereby create a desired rotation of said sliding carrier with respect to said sliding surface.

14. The snow and water sliding carrier of claim 12, wherein the head of each said nipple is shaped such that a variety of tools can be used to rotate them appropriately; and wherein said tools are chosen from a list of tools including screw drivers, Allen keys, and wrenches.

\* \* \* \* \*